July 17, 1962  V. LOMBARDO  3,044,668

RETRACTABLE SPOUT FOR CONTAINERS

Filed March 2, 1961

VINCENT LOMBARDO INVENTOR

BY A. J. De Angelis ATTORNEY

United States Patent Office 3,044,668
Patented July 17, 1962

3,044,668
RETRACTABLE SPOUT FOR CONTAINERS
Vincent Lombardo, 170 Ave. T, Brooklyn, N.Y.
Filed Mar. 2, 1961, Ser. No. 92,920
3 Claims. (Cl. 222—518)

This invention relates to retractable pouring spouts for containers.

It has among its objects to provide an improved retractable pouring spout which is held in retracted condition by a sliding door, and which upon the door being moved only slightly towards its fully opened position is automatically projected into pouring condition, completing the opening of the door, and which is automatically retracted by closing movement of the door.

Other objects of this invention are to provide such retractable spouts operative by movement of the sliding door sealing the spout aperture in order that containers so equipped may be readily and quickly opened and closed while using only one hand and yet be inexpensively and effectively sealed.

In the accompanying drawings, one embodiment of the invention has been illustrated in connection with a metallic container such as is adapted for use in connection with coffee or the like, although it is to be understood that the invention is also applicable for use with non-metallic containers and may be used for pouring either liquids or granular solids.

Figure 1:
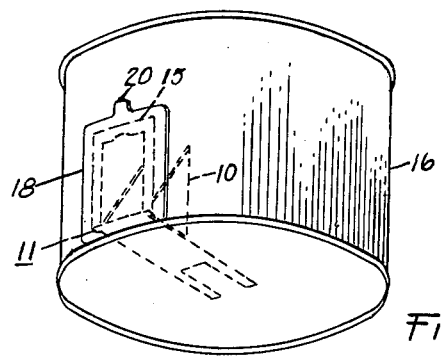
FIGURE 1 is a perspective schematic view of a container and the spout mounted therein in concealed position.
Figure 2:
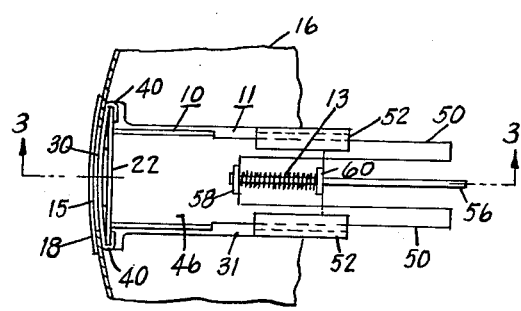
FIGURE 2 is a partial plan view in section of the retracted spout mounted in the container of FIGURE 1.

With reference to the drawings, spout 10 is shown slidably mounted in spout holder 11 in position for projection under the influence of biasing spring 13 through an aperture 15 defined in the side wall of a metallic container 16; it being understood that the spout may likewise be mounted to project through an aperture defined in the top or bottom walls of the container, or through one defined in a metallic cover of a glass jar. The spout aperture is sealed by a thin flexible metallic strip 18 attached to the exterior of container 16, as by soldering. Tab 20 formed at the upper end of strip 18 is provided for removing the strip by means of a slotted key (not shown), as is usually supplied with coffee cans. Removal of strip 18 exposes a vertically sliding door 22 which serves to close the spout aperture after the strip has been removed and discarded.

Figure 5:
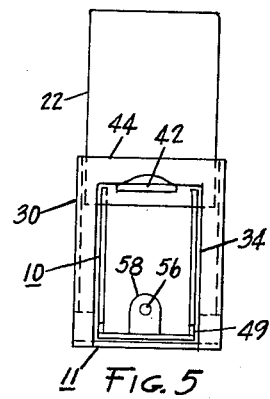
FIGURE 5 is a front elevational view of the spout extended.
Figure 4:
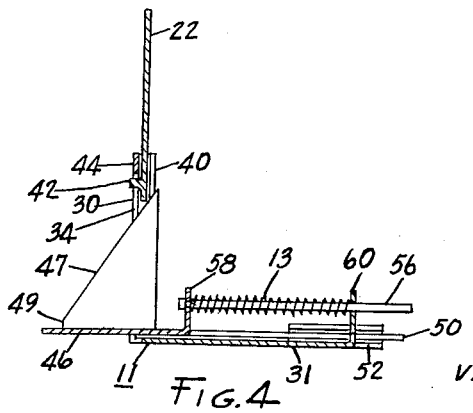
FIGURE 4 is a view similar to FIGURE 3 but with the spout shown in its extended position.

Spout holder 11 is of L-shaped configuration and has a vertically extending flange portion 30 and a horizontally extending flange portion 31. Flange portion 30 has defined therein a rectangular aperture 34 of dimensions approximating the spout aperture defined in the wall of container 16. Spout holder 11 may be mounted inside of container 16 by any suitable means, such as by soldering, brazing or crimping of flange portion 30 to the container wall, in position for opening 34 to coincide with spout aperture 15. Vertically sliding door 22 for opening and closing spout aperture 15 is positioned in guides 40 formed at the vertical side edges of flange portion 30. A slight projection 42 formed at the lowermost edge of door 22 acts as a door knob and projects into aperture 34 to limit the upward movement of the door by striking upper portion 44 of flange 30, when the door is moved to its uppermost position (see FIGURES 4 and 5).

Spout 10 consists of a horizontally disposed base member 46 and two vertically extending flanges or wings 48 formed integral therewith to provide a pouring funnel. Each wing 48 is of right triangular configuration with the inclined edge 47, forming the hypotenuse of the triangle, disposed toward the pouring aperture of the container; the lowermost portion of the wing being cut away to form a vertical edge 49, for purposes to be explained later. The vertical dimension of wings 48 is such that their uppermost portions, when door 22 is fully opened (FIGURE 4), press against the bottom edge of the door to act as stops, limiting the outward movement of spout 10 under the influence of biasing spring 13. The inner portion of base member 46 is U-shaped to provide two spaced rails 50, extending toward the inside of the container and slidably positioned in guides 52 formed at the horizontal side edges of flange portion 31 of spout holder 11.

Coil spring 13, biasing spout 10 toward extended position, encircles rod 56 which is secured at one end to upwardly extending spring support 58 formed at the junction of rails 50 of base member 46 of the spout. The other end of rod 56 is slidably confined in an aperture formed in spring support 60, extending upwardly from flange 31 of spout holder 11 and formed integral therewith.

Figure 3:
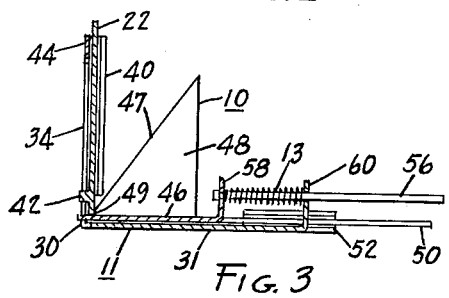
FIGURE 3 is a side elevational view taken along line 3—3 of FIGURE 2 with the container omitted.

When spout 10 is moved against the force of spring 13 into its fully retracted position and door 22 is closed fully (FIGURE 3), vertical edges 49 of wings 48 of the spout press against the inside surface of the bottom portion of the door with sufficient force to provide a frictional engagement therebetween which maintains the door closed. When it is desired to extend spout 10, it is only necessary to move door 22 slightly upward until it moves out of engagement with vertical edges 49, at which point spout 10 is pushed outward by biasing spring 13, causing the bottom edge of the door to ride upward along inclined edges 47 of wings 48. As door 22 arrives at its fully opened position, projection 42 of the door strikes upper portion 44 of flange 30, stopping the door movement and in turn the outward movement of the spout, as has been previously described.

Spout 10 may be moved back into its retracted position against the force of biasing spring 13 and the spout aperture sealed in either of two ways: by pushing spout 10 inward, thereby allowing sliding door 22 under the influence of gravity to ride down inclined edges 47 of the spout until vertical edges 49 again frictionally engage its bottom inside surface, so as to hold the door closed when the spout is released; or by moving door 22 downward so that its bottom edge in riding down inclined edges 47 forces spout 10 to retracted position against the force of biasing spring 13 until the door rides off of the inclined edges and into frictional engagement with vertical edges 49.

It may be noted that the subject spout may be operated easily with only one hand, since the door need be moved only slightly toward its opened position to cause the spout to be automatically propelled to its pouring position, and by merely moving the door to its closed position spout 10 is automatically retracted and the door held in its fully closed position.

If it is desired, all the spout components described except coil spring 13 may be formed of plastic material. Also, wings 48 of the spout may be of any other suitable configuration, such as with concave or convex inclined edges instead of the straight inclined edges 47 shown.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A retractable container spout assembly comprising; an L-shaped holder having a vertical flange and a horizontal flange, said vertical flange having a spout aperture formed therein and vertical side edge portions bent over forming spaced apart vertical door guides; a spout slidably mounted on said horizontal flange of said holder for projection through said spout aperture, said spout consisting of a funnel portion having a horizontally disposed bottom pouring flange and a pair of upwardly directed side wings formed integral therewith, said side wings each having a front substantially vertical edge extending upwardly a predetermined distance from said pouring flange and an upper edge inclined upwardly from the top of said front vertical edge in a direction away from said spout aperture; spring means biasing said spout toward extended position for projection through said spout aperture, and a vertically sliding door for opening and closing said spout aperture, said door being slidably mounted in said door guides with its bottom edge disposed to lie outside said front vertical edge of said spout side wings when the spout is in its fully retracted position and to engage said inclined upper edge of said spout side wings under conditions where said door is moved upwardly a distance greater than the height of said front vertical edge spout.

2. A spout assembly as set forth in claim 1 wherein said spout aperture formed in said vertical flange is of substantially rectangular configuration, and wherein said side wings of said spout are dimensioned vertically relative to the height of said spout aperture to a height predetermined to limit outward movement of said spout under conditions where said door is in its fully opened position.

3. A spout assembly as set forth in claim 1 wherein said vertically sliding door includes a projection formed adjacent the bottom edge of the door and extending into said spout aperture to act as a door stop limiting upward door movement.

References Cited in the file of this patent
UNITED STATES PATENTS

| | | |
|---|---|---|
| 424,901 | Raymond | Apr. 1, 1890 |
| 994,221 | Tuttle | June 6, 1911 |
| 1,229,525 | Ross | June 12, 1917 |
| 1,596,638 | Turpel et al. | Aug. 17, 1926 |
| 1,630,538 | Micallef | May 31, 1927 |
| 2,124,241 | Arb | July 19, 1938 |